United States Patent
Cao et al.

(10) Patent No.: US 12,538,184 B2
(45) Date of Patent: Jan. 27, 2026

(54) COMMUNICATION DEVICE INITIATED QUALITY OF SERVICE WITH SERVICE LEVEL AGREEMENT FOR SUPPORTING QUALITY OF SERVICE MODIFICATION

(71) Applicant: Telefonaktiebolaget LM Ericsson (publ), Stockholm (SE)

(72) Inventors: Jinyao Cao, Gothenburg (SE); Maria Belen Pancorbo Marcos, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 18/285,248

(22) PCT Filed: Mar. 30, 2022

(86) PCT No.: PCT/IB2022/052964
§ 371 (c)(1),
(2) Date: Sep. 30, 2023

(87) PCT Pub. No.: WO2022/214918
PCT Pub. Date: Oct. 13, 2022

(65) Prior Publication Data
US 2024/0172051 A1    May 23, 2024

(30) Foreign Application Priority Data
Apr. 6, 2021 (EP) .................... 21382287

(51) Int. Cl.
*H04W 28/24* (2009.01)
*H04L 9/40* (2022.01)
*H04W 28/02* (2009.01)

(52) U.S. Cl.
CPC ........... *H04W 28/24* (2013.01); *H04L 63/164* (2013.01); *H04W 28/0268* (2013.01)

(58) Field of Classification Search
CPC .. H04W 28/24; H04W 28/0268; H04L 63/164
See application file for complete search history.

(56) References Cited

U.S. PATENT DOCUMENTS 11,082,881 B2 *  8/2021  Chen .................. H04W 28/0268
11,863,465 B1 *  1/2024  Nijim ..................... H04L 47/805
(Continued)

FOREIGN PATENT DOCUMENTS

EP      1638262 A1     3/2006

OTHER PUBLICATIONS

International Search Report and Written Opinion of the International Searching Authority, PCT/IB2022/052964, mailed Jul. 4, 2022, 14 pages.
(Continued)

*Primary Examiner* — Nam T Tran
(74) *Attorney, Agent, or Firm* — Sonoda & Kobayashi Intellectual Property Law; Sarvajit S. Patil (57) ABSTRACT

A method performed by a first network node in a first network is provided for support in a second network of a quality of service, QoS, of the first network for a communication device initiated QoS modification. The method includes checking a QoS profile for a QoS flow of the first network based on a service level agreement, SLA, between the first network and the second network to determine whether the QoS flow is supported by the second network. The method further includes creating a dedicated internet protocol security, IPsec, security association, SA, for handling the QoS flow; and setting a differentiated services code point, DSCP, value of the dedicated IPsec SA according to the SLA. Methods performed by a second network node and by a communication device are also provided.

10 Claims, 8 Drawing Sheets (56) References Cited

U.S. PATENT DOCUMENTS

| | | | | |
|---|---|---|---|---|
| 2009/0144819 | A1* | 6/2009 | Babbar | H04L 63/164 726/13 |
| 2019/0274178 | A1* | 9/2019 | Salkintzis | H04W 28/0268 |
| 2020/0344769 | A1* | 10/2020 | Salkintzis | H04W 28/0268 |
| 2024/0187918 | A1* | 6/2024 | Salkintzis | H04W 28/0268 |

OTHER PUBLICATIONS

Nokia et al., "KI#2, New Sol: Solution for offering QoS—simultaneous access to services by PLMN and SNPN," SA WG2 Meeting #140E, S2-2005728, Jun. 1-12, 2020, Elbonia, 7 pages.

Ericsson, "KI#2 T2: Informative guideline for mapping QoS parameters and DSCP marking," 3GPP TSG-SA WG2 Meeting #114E, S2-2102272, Elbonia, Apr. 12-16, 2021, 9 pages.

Ericsson, "Informative guideline for mapping between QoS parameters and DSCP marking," 3GPP TSG-CT3 Meeting #119bis-e, C3-220287, E-Meeting, Jan. 17-21, 2022, 10 pages.

3GPP TS 23.501 V17.0.0 (Mar. 2021); 3rd Generation Partnership Project; Technical Specification Group Services and System Aspects; System architecture for the 5G System (5GS); Stage 2 (Release 17), 489 pages.

International Preliminary Report on Patentability of the International Preliminary Examining Authority, PCT/IB2022/052964, mailed Jul. 18, 2023, 30 pages.

Ericsson, "KI#2 T2: Informative guideline for mapping QoS parameters and DSCP marking," 3GPP TSG-SA WG2 Meeting #143E, S2-2100282, Elbonia, Feb. 24-Mar. 9, 2021, 3 pages.

3GPP TS 23.501 V16.7.0 (Dec. 2020); 3rd Generation Partnership Project; Technical Specification Group Services and System Aspects; System architecture for the 5G System (5GS); Stage 2 (Release 16), 450 pages.

3GPP TS 23.502 V16.7.1 (Jan. 2021); 3rd Generation Partnership Project; Technical Specification Group Services and System Aspects; Procedures for the 5G System (5GS); Stage 2 (Release 16), 603 pages.

* cited by examiner

Check a QoS profile for a QoS flow of first network based on a service level agreement, SLA, between first network and second network to determine whether the QoS flow is supported by the second network
601

When the QoS is supported by the second network, create a dedicated internet protocol security, IPsec, security association, SA, for handling the QoS flow in the second network
603

Set a differentiated services code point, DSCP, value of the dedicated IPsec SA according to the SLA
605

Figure 6

```
┌─────────────────────────────────────────────────────────────────────────┐
│ Check a QoS profile for a QoS flow of first network based on a service  │
│ level agreement, SLA, between first network and second network to       │
│ determine whether the QoS flow is supported by the second network    601│
└─────────────────────────────────────────────────────────────────────────┘
                                     │
                                     ▼
┌─────────────────────────────────────────────────────────────────────────┐
│ When the QoS is supported by the second network, create a dedicated     │
│ internet protocol security, IPsec, security association, SA, for        │
│ handling the QoS flow in the second network                          603│
└─────────────────────────────────────────────────────────────────────────┘
                                     │
                                     ▼
┌─────────────────────────────────────────────────────────────────────────┐
│ Set a differentiated services code point, DSCP, value of the dedicated  │
│ IPsec SA according to the SLA                                        605│
└─────────────────────────────────────────────────────────────────────────┘
                                     │
                                     ▼
┌─────────────────────────────────────────────────────────────────────────┐
│ Signal a message to communication device including a set of QoS         │
│ parameters describing the QoS flow                                   701│
└─────────────────────────────────────────────────────────────────────────┘
                                     │
                                     ▼
┌─────────────────────────────────────────────────────────────────────────┐
│ Signal a response to the communication device that includes that        │
│ includes the instruction to set the DSCP value                       703│
└─────────────────────────────────────────────────────────────────────────┘
                                     │
                                     ▼
┌─────────────────────────────────────────────────────────────────────────┐
│ Instruct the communication device to set the DSCP value of the          │
│ dedicated IPsec SA for the service of the first network based on        │
│ mapping in the SLA between the DSCP value of the dedicated IPsec SA     │
│ and a set of QoS parameters for the service of the first network     705│
└─────────────────────────────────────────────────────────────────────────┘
```

Figure 7

Receive, from communication device, a differentiated services code point, DSCP, value and a set of QoS parameters describing a QoS flow of first network  801

Determine whether the DSCP value and the corresponding set of QoS parameters describing the QoS flow is included in a service level agreement, SLA, between the first network and the second network  803

Figure 8

Receive, from communication device, a differentiated services code point, DSCP, value and a corresponding set of QoS parameters describing a QoS flow of first network  801

Determine whether the DSCP value and the corresponding set of QoS parameters describing the QoS flow is included in a service level agreement, SLA, between the first network and the second network  803

Authorize request of communication device to modify the QoS to access service when the DSCP value and the corresponding set of QoS parameters describing the QoS flow is included in the SLA  901

Install a policy and charging control, PCC, rule on second network node to create a new QoS flow in the second network using the set QoS parameters describing the QoS flow of first network  903

Establish the QoS flow in the second network supporting the dedicated IPsecSA with the QoS of the first network  905

Figure 9

Receive, from first network node in first network, an instruction to set a differentiated services code point, DSCP, value of dedicated IPsec SA for service of first network, the instruction based on a mapping in a service level agreement, SLA, between the DSCP value of the dedicated IPsec SA and a set of QoS parameters for the service of first network 1001

Add the DSCP value to a packet filter when the communication device initiates QoS modification in second network 1003

Figure 10

Receive a message from first network node including a set of QoS parameters describing a QoS flow 1101

Receive, from first network node in first network, an instruction to set a differentiated services code point, DSCP, value of dedicated IPsec SA for service of first network, the instruction based on a mapping in a service level agreement, SLA, between the DSCP value of the dedicated IPsec SA and a set of QoS parameters for the service of first network 1001

Add the DSCP value to a packet filter when the communication device initiates QoS modification in second network 1003

Signal a request to second network node for a QoS flow based on the set of QoS parameters describing the QoS flow, the QoS rule of the requested QoS flow including the packet filter having an internet protocol, IP, address for the first network node, a security parameter index, SPI, and the DSCP value associated with the dedicated IPSec SA flow 1103

Establish the QoS flow in the second network supporting the dedicated IPsecSA with the QoS of the first network 1105

Figure 11

COMMUNICATION DEVICE INITIATED QUALITY OF SERVICE WITH SERVICE LEVEL AGREEMENT FOR SUPPORTING QUALITY OF SERVICE MODIFICATION

CROSS REFERENCE TO RELATED APPLICATIONS

This application is a 35 U.S.C. § 371 national stage application of PCT International Application No. PCT/IB2022/052964 filed on Mar. 30, 2022, which in turn claims foreign priority to European Patent Application No. 21382287.7, filed on Apr. 6, 2021, the disclosures and content of which are incorporated by reference herein in their entirety.

TECHNICAL FIELD

The present disclosure relates generally to support in a second network of a quality of service, QoS, of a first network for a communication device initiated QoS modification when the communication device is accessing a service of the first network via the second network, and related methods and apparatuses.

BACKGROUND

When a user equipment (UE) is accessing a public land mobile network (PLMN) service via a stand-alone non-public network (SNPN) as specified in clause 5.30.2.7 and Annex D.3 in the third generation partnership project (3GPP) TS 23.501 V17, the SNPN is acting as untrusted non-3GPP access for the PLMN. The UE first registers and establishes a packet data unit (PDU) session and a User Plane in the SNPN. Then UE connects to a non-3GPP interworking function (N3IWF) in the PLMN via the User Plane established in the SNPN, and performs registration and PDU session establishment in the PLMN. All the traffic between UE and PLMN is transported via the User Plane in SNPN, in the form of internet protocol security (IPsec) security association (SA).

SUMMARY

In various embodiments, a method is provided that is performed by a first network node in a first network for support in a second network of a quality of service, QoS, of the first network for a communication device initiated QoS modification when the communication device is accessing a service of the first network via the second network. The method includes checking a QoS profile for a QoS flow of the first network based on a service level agreement, SLA, between the first network and the second network to determine whether the QoS flow is supported by the second network. The method further includes, when the QoS is supported by the second network, creating a dedicated internet protocol security, IPsec, security association, SA, for handling the QoS flow in the second network. The method further includes setting a differentiated services code point, DSCP, value of the dedicated IPsec SA according to the SLA.

In various embodiments, a first network node in a first network is provided. The first network node includes processing circuitry, and at least one memory coupled with the processing circuitry. The memory includes instructions that when executed by the processing circuitry causes the first network node to perform operations for support in a second network of a quality of service, QoS, of the first network for a communication device initiated QoS modification when the communication device is accessing a service of the first network via the second network. The operations include check a QoS profile for a QoS flow of the first network based on a service level agreement, SLA, between the first network and the second network to determine whether the QoS flow is supported by the second network. The operations further include, when the QoS is supported by the second network, create a dedicated internet protocol security, IPsec, security association, SA, for handling the QoS flow in the second network. The operations further include set a differentiated services code point, DSCP, value of the dedicated IPsec SA according to the SLA.

In various embodiments, a first network node in a first network is provided. The first network node is adapted to perform operations for support in a second network of a quality of service, QoS, of the first network for a communication device initiated QoS modification when the communication device is accessing a service of the first network via the second network. The operations include check a QoS profile for a QoS flow of the first network based on a service level agreement, SLA, between the first network and the second network to determine whether the QoS flow is supported by the second network. The operations further include, when the QoS is supported by the second network, create a dedicated internet protocol security, IPsec, security association, SA, for handling the QoS flow in the second network. The operations further include set a differentiated services code point, DSCP, value of the dedicated IPsec SA according to the SLA.

In various embodiments, a computer program including program code to be executed by processing circuitry of a first network node in a first network is provided. The program code causes the first network node to perform operations for support in a second network of a quality of service, QoS, of the first network for a communication device initiated QoS modification when the communication device is accessing a service of the first network via the second network. The operations include check a QoS profile for a QoS flow of the first network based on a service level agreement, SLA, between the first network and the second network to determine whether the QoS flow is supported by the second network. The operations further include, when the QoS is supported by the second network, create a dedicated internet protocol security, IPsec, security association, SA, for handling the QoS flow in the second network. The operations further include set a differentiated services code point, DSCP, value of the dedicated IPsec SA according to the SLA.

In various embodiments, a computer program product including a non-transitory storage medium including program code to be executed by processing circuitry of a first network node in a first network is provided. Execution of the program code causes the first network node to perform operations for support in a second network of a quality of service, QoS, of the first network for a communication device initiated QoS modification when the communication device is accessing a service of the first network via the second network. The operations include check a QoS profile for a QoS flow of the first network based on a service level agreement, SLA, between the first network and the second network to determine whether the QoS flow is supported by the second network. The operations further include, when the QoS is supported by the second network, create a dedicated internet protocol security, IPsec, security association, SA, for handling the QoS flow in the second network.

The operations further include set a differentiated services code point, DSCP, value of the dedicated IPsec SA according to the SLA.

In various embodiments, a method is provided that is performed by a second network node in a second network for support in the second network of a quality of service, QoS, of a first network for a communication device initiated QoS modification when the communication device is accessing a service of the first network via the second network. The method includes receiving, from the communication device, a differentiated services code point, DSCP, value and a corresponding set of QoS parameters describing a QoS flow of the first network. The method further includes, responsive to the receiving, determining whether the DSCP value and the corresponding set of QoS parameters describing the QoS flow is included in a service level agreement, SLA, between the first network and the second network.

In various embodiments a second network node in a second network is provided. The second network node includes processing circuitry, and at least one memory coupled with the processing circuitry. The memory includes instructions that when executed by the processing circuitry causes the second network node to perform operations for support in the second network of a quality of service, QoS, of a first network for a communication device initiated QoS modification when the communication device is accessing a service of the first network via the second network. The operations include receive, from the communication device, a differentiated services code point, DSCP, value and a corresponding set of QoS parameters describing a QoS flow of the first network. The operations further include, responsive to the receiving, determine whether the DSCP value and the corresponding set of QoS parameters describing the QoS flow is included in a service level agreement, SLA, between the first network and the second network.

In various embodiments, a second network node in a second network is provided. The second network node is adapted to perform operations for support in the second network of a quality of service, QoS, of a first network for a communication device initiated QoS modification when the communication device is accessing a service of the first network via the second network. The operations include receive, from the communication device, a differentiated services code point, DSCP, value and a corresponding set of QoS parameters describing a QoS flow of the first network. The operations further include, responsive to the receiving, determine whether the DSCP value and the corresponding set of QoS parameters describing the QoS flow is included in a service level agreement, SLA, between the first network and the second network.

In various embodiments, a computer program including program code to be executed by processing circuitry of a second network node in a second network is provided. The program code causes the second network node to perform operations for support in the second network of a quality of service, QoS, of a first network for a communication device initiated QoS modification when the communication device is accessing a service of the first network via the second network. The operations include receive, from the communication device, a differentiated services code point, DSCP, value and a corresponding set of QoS parameters describing a QoS flow of the first network. The operations further include, responsive to the receiving, determine whether the DSCP value and the corresponding set of QoS parameters describing the QoS flow is included in a service level agreement, SLA, between the first network and the second network.

In various embodiments, a computer program product including a non-transitory storage medium including program code to be executed by processing circuitry of a second network node in a second network is provided. Execution of the program code causes the second network node to perform operations for support in the second network of a quality of service, QoS, of a first network for a communication device initiated QoS modification when the communication device is accessing a service of the first network via the second network. The operations include receive, from the communication device, a differentiated services code point, DSCP, value and a corresponding set of QoS parameters describing a QoS flow of the first network. The operations further include, responsive to the receiving, determine whether the DSCP value and the corresponding set of QoS parameters describing the QoS flow is included in a service level agreement, SLA, between the first network and the second network.

In various embodiments, a method is provided that is performed by a communication device for support in a second network of a quality of service, QoS, of a first network for a QoS modification initiated by the communication device when the communication device is accessing a service of the first network via the second network. The method includes receiving, from a first network node in the first network, an instruction to set a differentiated services code point, DSCP, value of a dedicated IPsec SA for the service of the first network. The instruction based on a mapping in a service level agreement, SLA, between the DSCP value of the dedicated IPsec SA and a set of QoS parameters for the service of the first network. The method further includes adding the DSCP value to a packet filter when the communication device initiates the QoS modification in the second network.

In various embodiments a communication device is provided. The communication device includes processing circuitry, and at least one memory coupled with the processing circuitry. The memory includes instructions that when executed by the processing circuitry causes the communication device to perform operations for support in a second network of a quality of service, QoS, of a first network for a QoS modification initiated by the communication device when the communication device is accessing a service of the first network via the second network. The operations include receive, from a first network node in the first network, an instruction to set a differentiated services code point, DSCP, value of a dedicated IPsec SA for the service of the first network. The instruction based on a mapping in a service level agreement, SLA, between a DSCP value of the dedicated IPsec SA and a set of QoS parameters for the service of the first network. The operations further include add the DSCP value to a packet filter when the communication device initiates the QoS modification in the second network.

In various embodiments, a communication device is provided. The communication device is adapted to perform operations for support in a second network of a quality of service, QoS, of a first network for a QoS modification initiated by the communication device when the communication device is accessing a service of the first network via the second network. The operations include receive, from a first network node in the first network, an instruction to set a differentiated services code point, DSCP, value of a dedicated IPsec SA for the service of the first network. The instruction based on a mapping in a service level agreement, SLA, between a DSCP value of the dedicated IPsec SA and a set of QoS parameters for the service of the first network. The operations further include add the DSCP value to a packet filter when the communication device initiates the QoS modification in the second network.

In various embodiments, a computer program including program code to be executed by processing circuitry of a communication device is provided. The program code causes the communication device to perform operations for a QoS modification initiated by the communication device when the communication device is accessing a service of the first network via the second network. The operations include receive, from a first network node in the first network, an instruction to set a differentiated services code point, DSCP, value of a dedicated IPsec SA for the service of the first network. The instruction based on a mapping in a service level agreement, SLA, between a DSCP value of the dedicated IPsec SA and a set of QoS parameters for the service of the first network. The operations further include add the DSCP value to a packet filter when the communication device initiates the QoS modification in the second network.

In various embodiments, a computer program product including a non-transitory storage medium including program code to be executed by processing circuitry of a communication device is provided. Execution of the program code causes the communication device to perform operations for a QoS modification initiated by the communication device when the communication device is accessing a service of the first network via the second network. The operations include receive, from a first network node in the first network, an instruction to set a differentiated services code point, DSCP, value of a dedicated IPsec SA for the service of the first network. The instruction based on a mapping in a service level agreement, SLA, between a DSCP value of the dedicated IPsec SA and a set of QoS parameters for the service of the first network. The operations further include add the DSCP value to a packet filter when the communication device initiates the QoS modification in the second network.

For user equipment initiated QoS modification, a requested QoS rule may be based on a network node (e.g., N3IWF) internet protocol (IP) address and a security parameter index (SPI) associated with an IPsecSA. The SPI may be dynamically allocated at the UE/network node side when establishing the IPsecSA, and may not be used for the network to determine if QoS request from the UE is authorized or not. Potential advantages provided by various embodiments of the present disclosure may include that a network that receives the UE request may be able to determine if the request is authorized, or not, directly according to a differentiated services code point (DSCP) value in the QoS rule and a service level agreement (SLA).

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIGS. 10-11 are flow charts illustrating operations of a communication device in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "network node" is used in a non-limiting manner and, as explained below, can refer without limitation to any type of network node in a telecommunications network performing support in a second network of a QoS of a first network for a communication device initiated QoS modification including, without limitation, a PLMN N3IWF node, an SNPN session management function (SMF) node, and/or an SNPN policy control function (PCF) node. As used herein, "first network" is used in a non-limiting manner and, as explained below, can refer to any type of network with respect to a second network that is an overlay network or an underlay network, respectively (e.g., a PLMN or a SNPN, respectively). As used herein, "second network" is used in a non-limiting manner and as explained below, can refer to any type of network with respect to the first network that is an underlay network or an overlay network, respectively (e.g., a SNPN or a PLMN, respectively).

The following explanation of potential problems with some approaches is a present realization as part of the present disclosure and is not to be construed as previously known by others.

In some approaches, e.g., in 3GPP TS 23.501 V17 clause 5.30.27 and Annex D.3, in order to differentiate the QoS for the IPsec SA in SNPN, there two mechanisms are specified.

One mechanism is a network initiated QoS modification, where the two networks based on service level agreement (SLA) decide what differentiated services code point (DSCP) marking will be used on the IPsec SA and what are the corresponding QoS parameters to be used when the internet protocol (IP) header of the IPsec SA is marked with this DSCP value. A second mechanism is a UE initiated QoS modification, relying on the UE to request a proper QoS from the SNPN for handling the IPsec SA. The requested QoS in the SNPN is the QoS UE receives from the PLMN.

In another approach, the same principle applies when a UE is accessing a SNPN service via a PLMN as specified, e.g., in clause 5.30.2.8 and Annex D.3 in 3GPP TS 23.501 V17.

In some approaches, for a UE initiated QoS modification, the requested QoS rule is based on a N3IWF IP address and the SPI associated with the IPsec SA. The SPI is dynamically allocated at the UE/N3IWF side when establishing the IPsec SA, and may not be used for the network to determine if such QoS request from the UE is authorized or not.

Thus, in such approaches, a UE-initiated QoS mechanism to support QoS differentiation when the UE is accessing a SNPN via a PLMN, or vice versa, does not have the SLA support. As a consequence, the network that receives the UE request may not know how to react on the UE request, e.g., whether or not to allocate the resources for the UE.

Various embodiments of the present disclosure may provide solutions to these and other potential problems. In various embodiments of the present disclosure, a DSCP value is introduced that is used on the IP header of the IPsec SA as extra information in the QoS rule requested by the UE. As a consequence, the DSCP value can be used by the network to determine if the QoS requested by UE can be authorized or not, according to a SLA.

Potential advantages provided by various embodiments of the present disclosure may include that the network that receives the UE request is able to determine if such request can be authorized or not according to the DSCP value in the QoS rule and the SLA.

Figure 1:
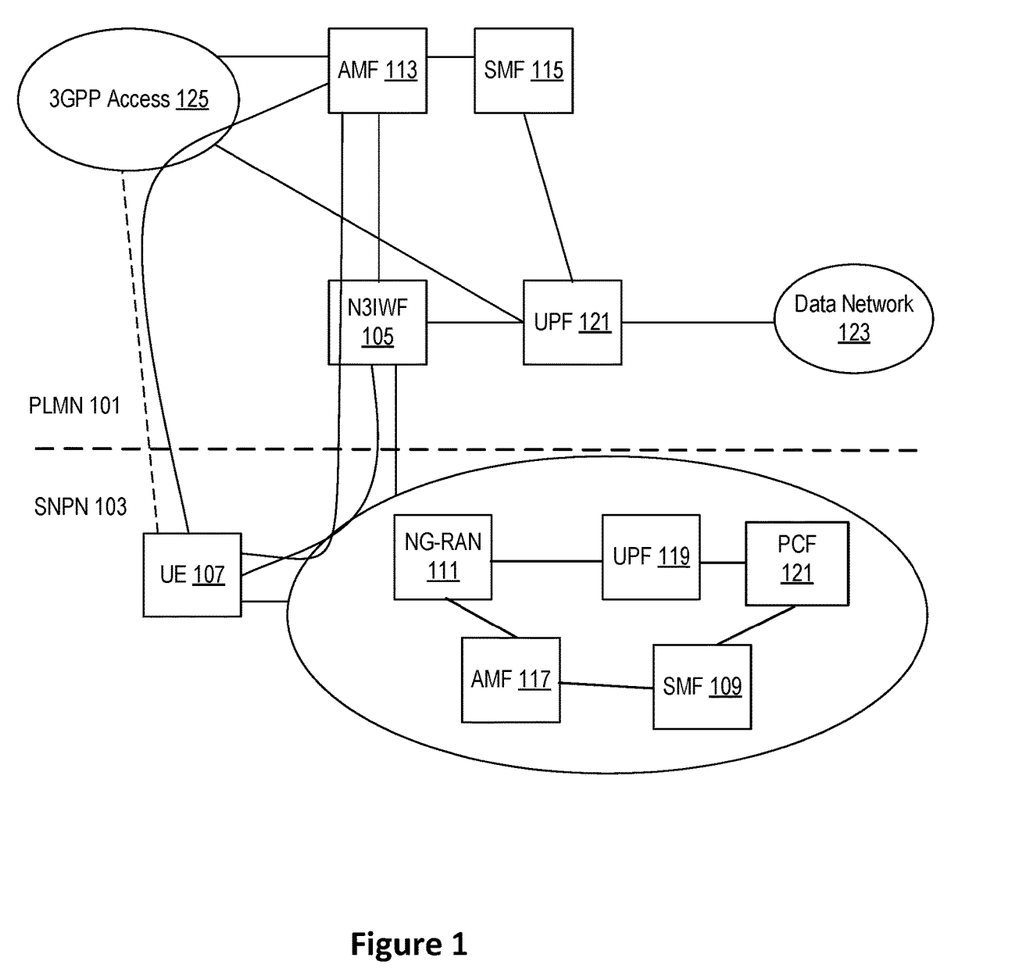
FIG. 1 is a schematic diagram illustrating an example of a first network (e.g., PLMN 101), a second network (e.g., SNPN 103), and a communication device (e.g., UE 107)

FIG. 1 is a schematic diagram illustrating an example of a first network (e.g., PLMN 101), a second network (e.g., SNPN 103), and a communication device (e.g., UE 107). PLMN 101 includes N3IWF node 105, access mobility function (AMF) node 113, SMF node 115, user plane function node 121, data network 123 and 3GPP access 125. SNPN 103 includes next generation (NG) radio access network (RAN) node 111, SMF node 109, AMF node 117, UPF node 119 and policy control function (PCF) node 121.

Figure 2:
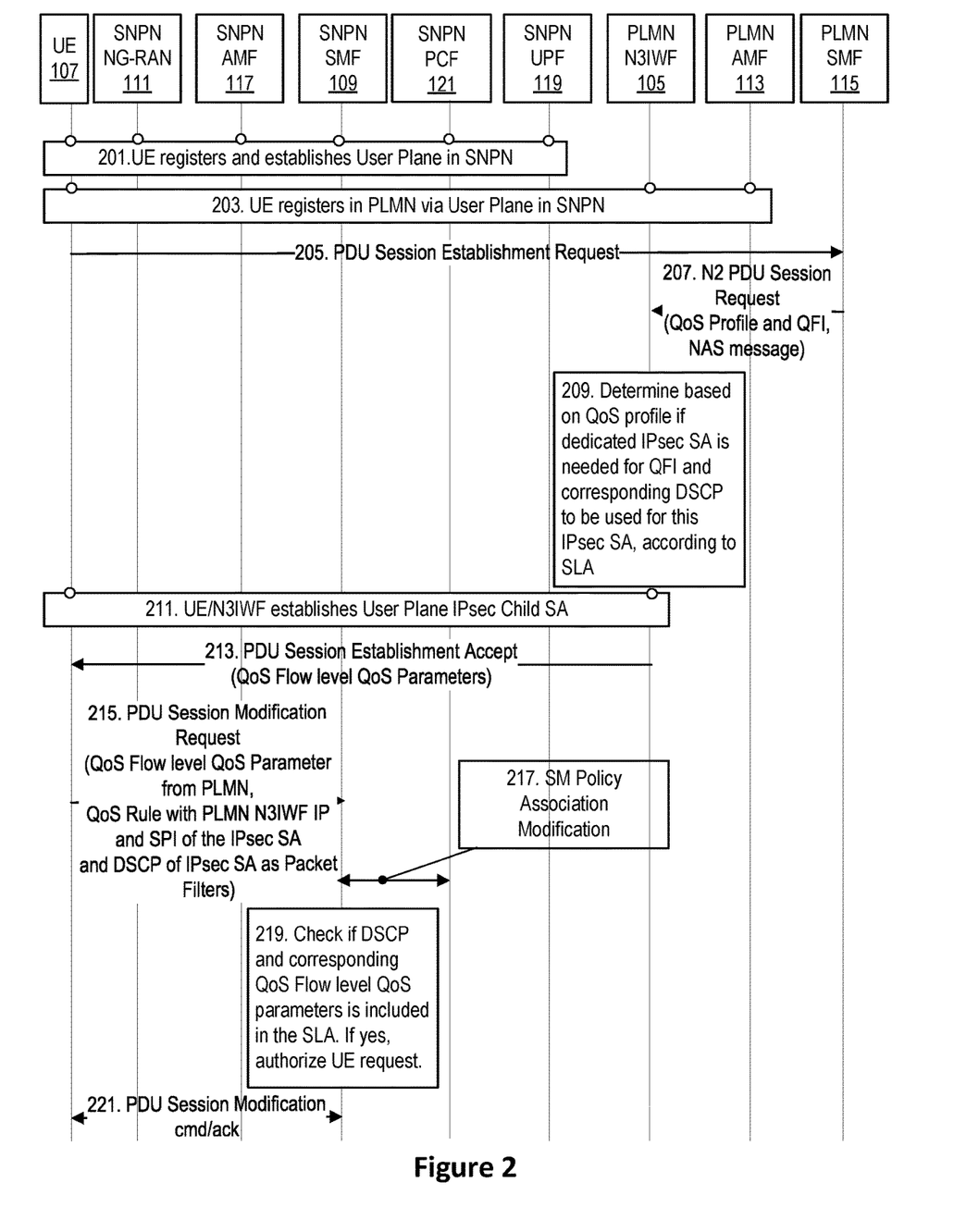
FIG. 2 is a signalling diagram of methods of a first network node, a second network node and a communication device, respectively, in accordance with some embodiments of the present disclosure.

FIG. 2 is a signalling diagram of methods of a first network node, a second network node and a communication device, respectively, in accordance with some embodiments of the present disclosure. FIG. 2 illustrates logic when UE 107 is accessing a first network (e.g., PLMN 101) service via a second network (e.g., SNPN 103). In other embodiments, the same logic applies when UE 107 is accessing an SNPN service via a PLMN.

Referring to operation 201 of FIG. 2, UE 107 registers and establishes a PDU Session in SNPN 103 (e.g., the second network).

At operation 203, UE 107 registers in a PLMN (e.g., the first network), via User Plane IP connectivity in SNPN 103.

At operation 205, UE 107 requests to establish a PDU session in PLMN 101.

At operation 207, SMF 115 in PLMN 101 accepts the UE 107 request via an N2 interface message sent to N3IWF 105. The N2 message to N3IWF 105 includes a QoS profile(s) and corresponding QoS flow identifier (QFI), PDU session identifier, etc.

At operation 209, a SLA is enabled for the UE-initiated QoS. N3IWF 105 in PLMN 101 checks the QoS profile for the QoS Flow with the SLA set up with SNPN 101 and determines if such QoS Flow can be supported by SNPN 101 as well. If yes, then N3IWF 105 decides to create a dedicated IPsec SA for handling this QoS Flow, and sets the DSCP value of this IPsec SA according to the SLA between the PLMN 101 and the SNPN 103. The SLA is configured in N3IWF 105, in PLMN 101 and in SMF 109 and/or PCF 121 in SNPN 101.

Referring now to operation 211, UE 107 and N3IWF 105 proceed with the User Plane IPSec SA establishment.

At operation 213, UE 107 receives a non-access stratum (NAS) message PDU Session Establishment Accept, including the QoS Flow description from the PLMN SMF 115.

At operation 215, UE 107 initiates a request (e.g., PDU Session Modification Request) with SNPN SMF 109. In the request, UE 107 requests the QoS rule with N3IWF 105 IP address, SPI and DSCP as a packet filter, and a set of QoS parameters to describe the QoS flow ("QoS Flow level QoS parameters") which UE 107 receives from PLMN SMF 115 in operation 213. Operation 215 is in contrast to the approach discussed above in the existing UE-initiated QoS mechanism described in clause 5.30.2.7 and clause 5.30.2.8 in 3GPP TS 23.501, in which a UE requests only a N3IWF IP address and SPI as a packet filter. In various embodiments of the present disclosure, by supporting SLA, a UE receives DSCP information (e.g., a DSCP value) from a first network node (e.g., N3IWF 105) in a first network (e.g., PLMN 101) at operation 211 and passes such information to a second network node (e.g., SMF 109/PCF 121) in a second network (e.g., SNPN 103), thus, facilitating the two networks to cooperate on how to support the QoS agreed in SLA.

In various embodiments of the present disclosure, SMF 109/PCF 121 in SNPN 103 is configured with the SLA between the PLMN and the SNPN.

At operation 217, or alternatively at operation 219, a second network node (e.g., PCF 121 in operation 217 or SMF 109 in operation 219) checks if the DSCP value (which is from the UE 107 request) and the QoS Flow level QoS parameters is included in the SLA between the second network (e.g., SNPN 103) and the first network (e.g., PLMN 101). If yes, the second network node authorizes the UE 107 request.

At operation 221, UE 107 and SMF 109 proceed with the PDU Session Modification, and establish a QoS Flow in the second network (e.g., SNPN 103) supporting the IPsec SA with the proper QoS.

In some embodiments, the same logic and operations described above apply to UE initiated QoS when accessing SNPN services via a PLMN by swapping the SNPN and PLMN discussed above with reference to FIG. 2.

Figure 3:
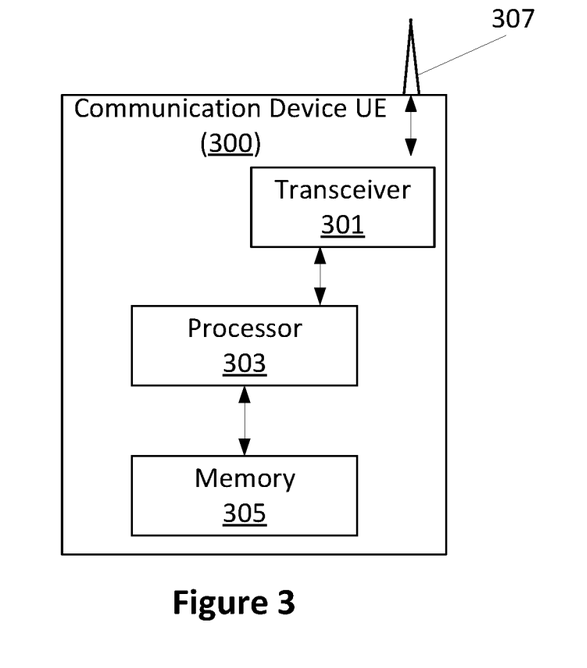
FIG. 3 is a block diagram illustrating elements of a communication device configured to provide wireless communication according to embodiments of the present disclosure.

FIG. 3 is a block diagram illustrating elements of a communication device 300 (also referred to as a user equipment, UE, a user equipment node/terminal/device, a mobile terminal, a mobile communication terminal, a wireless device, a wireless communication device, a wireless terminal, mobile device, a wireless communication terminal, etc.) configured to provide wireless communication according to embodiments of the present disclosure. As shown, communication device may include an antenna 307, and transceiver circuitry 301 (also referred to as a transceiver) including a transmitter and a receiver configured to provide uplink and downlink radio communications with a base station(s) of a radio access network (e.g., PLMN 101, SNPN 103, etc.). Communication device may also include processing circuitry 303 (also referred to as a processor) coupled to the transceiver circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device may also include an interface (such as a user interface) coupled with processing circuitry 303, and/or communication device may be incorporated in a vehicle.

As discussed herein, operations of communication device may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed herein with respect to example embodiments relating to communication devices). According to some embodiments, a communication device 300 and/or an element(s)/function(s) thereof may be embodied as a virtual node/nodes and/or a virtual machine/machines.

Figure 4:
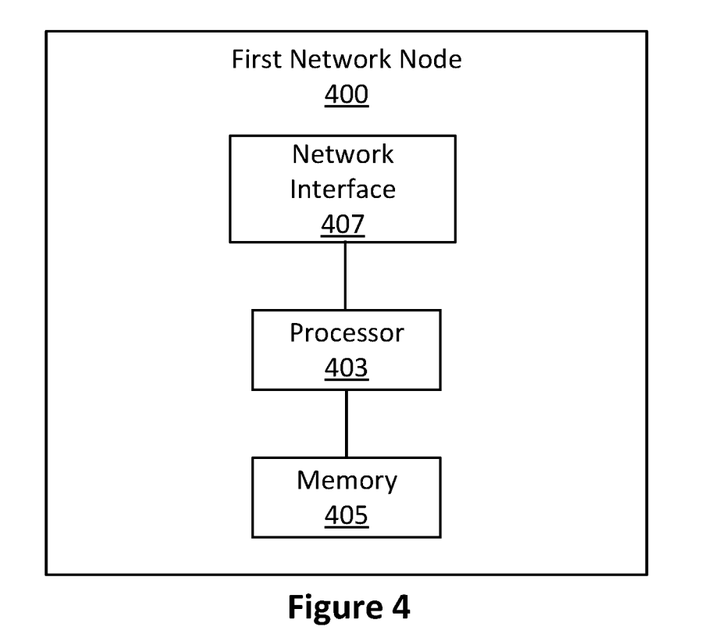
FIG. 4 is a block diagram illustrating elements of a first network node of a first network configured to provide cellular communication according to embodiments of the present disclosure.

FIG. 4 is a block diagram illustrating elements of a first network node (e.g., a PLMN N3IWF node, a SNPN N3IWF, etc.) of a first network (e.g., a PLMN or a SNPN) configured to provide cellular communication according to embodiments of the present disclosure. As shown, the first network node may include network interface circuitry 407 (also referred to as a network interface) configured to provide communications with other nodes of the first network and/or a second network, and/or a radio access network RAN. The first network node may also include a processing circuitry 403 (also referred to as a processor) coupled to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the first network node may be performed by processing circuitry 403 and/or network interface circuitry 407. For example, processing circuitry 403 may control network interface circuitry 407 to transmit communications through network interface circuitry 407 to one or more other network nodes and/or to receive communications through network interface circuitry from one or more other network nodes. Moreover, modules may be stored in memory 405, and these modules may provide instructions so that when instructions of a module are executed by processing circuitry 403, processing circuitry 403 performs respective operations (e.g., operations discussed herein with respect to example embodiments relating to first network nodes). According to some embodiments, first network node 400 and/or an element(s)/function(s) thereof may be embodied as a virtual node/nodes and/or a virtual machine/machines.

Figure 5:
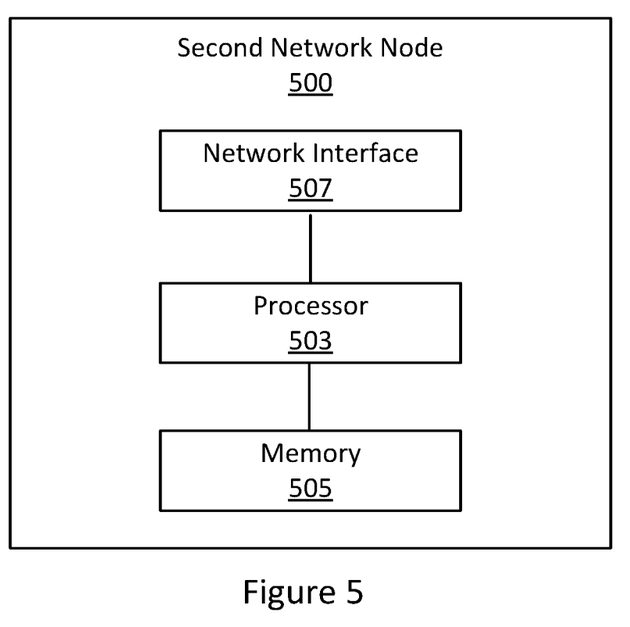
FIG. 5 is a block diagram illustrating elements of a second network node of a second network configured to provide cellular communication according to embodiments of the present disclosure.

FIG. 5 is a block diagram illustrating elements of a second network node (e.g., a SNPN SMF, a SNPN PCF, a PLMN SMF, a PLMN PCF, etc.) of a second network (e.g., a SNPN or a PLMN) configured to provide cellular communication according to embodiments of the present disclosure. As shown, the second network node may include network interface circuitry 507 (also referred to as a network interface) configured to provide communications with other nodes of the second network and/or a first network, and/or a radio access network RAN. The second network node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the second network node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed herein with respect to example embodiments relating to second network nodes). According to some embodiments, second network node 500 and/or an element(s)/function(s) thereof may be embodied as a virtual node/nodes and/or a virtual machine/machines.

Now that the operations of the various components have been described, operations specific to a first network node (e.g., node 105 implemented using the structure of the block diagram of FIG. 4) will now be discussed with reference to the flow charts of FIGS. 6-7 according to some embodiments of inventive concepts. For example, modules may be stored in memory 405 of FIG. 4, and these modules may provide instructions so that when the instructions of a module are executed by respective first network node processing circuitry 403, processing circuitry 403 performs respective operations of the flow charts of FIGS. 6-7.

Figure 6:
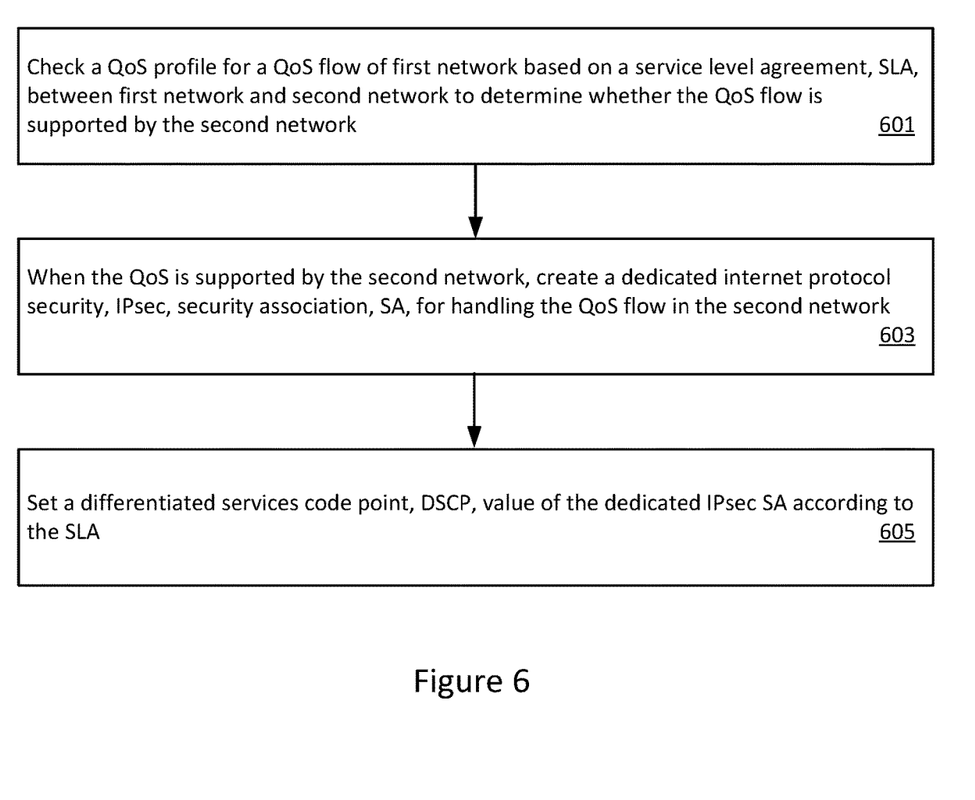
FIGS. 6-7 are flow charts illustrating operations of a first network node in accordance with some embodiments of the present disclosure.
Figure 7:
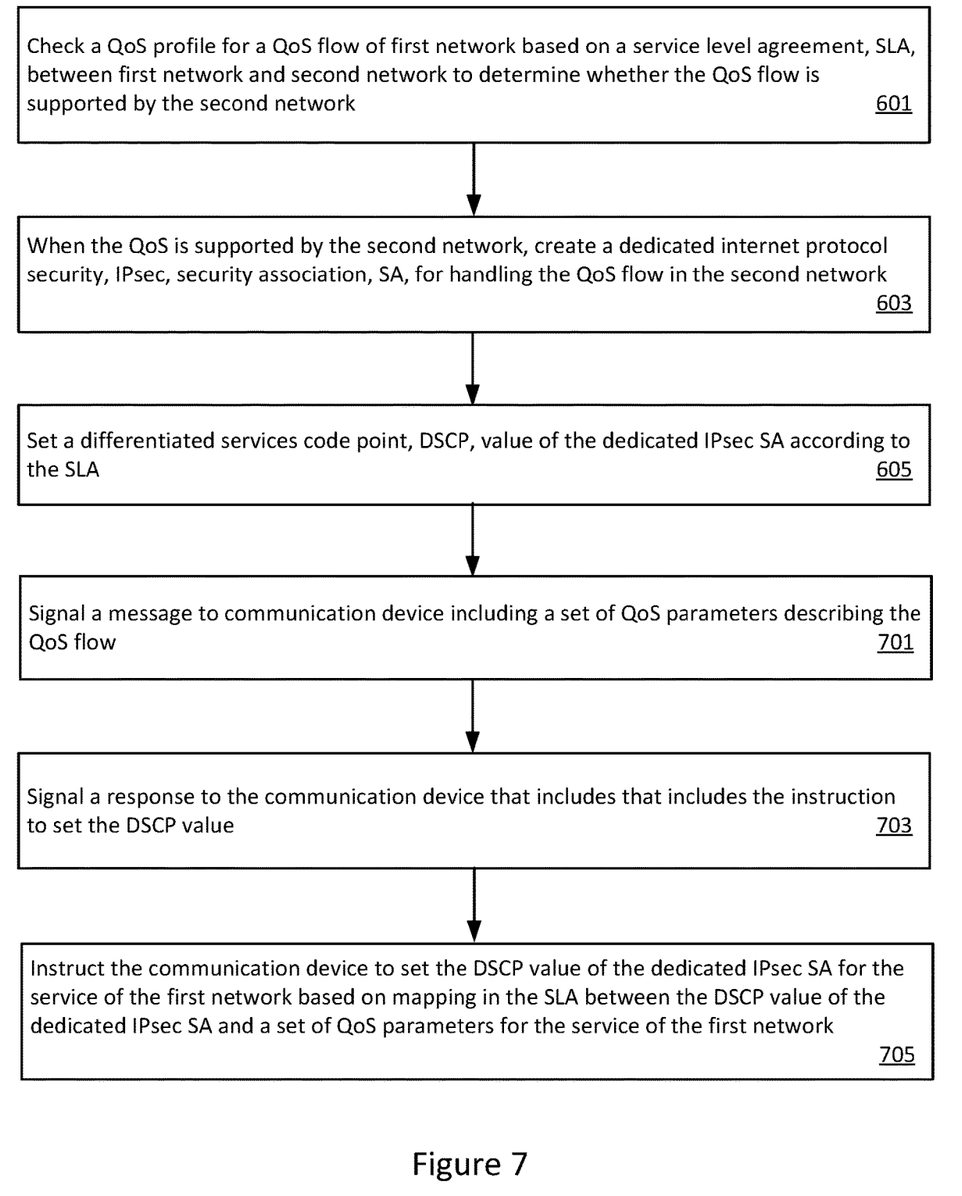

Each of the operations described in FIGS. 6-7 can be combined and/or omitted in any combination with each other, and it is contemplated that all such combinations fall within the spirit and scope of this disclosure.

Referring first to FIG. 6, a method is performed by a first network node (e.g., 105, 400) in a first network (e.g., 101, 103) for support in a second network (e.g., 103, 101) of a quality of service, QoS, of the first network for a communication device (e.g., 107) initiated QoS modification when the communication device is accessing a service of the first network via the second network. The method includes checking (601) a QoS profile for a QoS flow of the first network based on a service level agreement, SLA, between the first network and the second network to determine whether the QoS flow is supported by the second network. The method further includes, when the QoS is supported by the second network, creating (603) a dedicated internet protocol security, IPsec, security association, SA, for handling the QoS flow in the second network. The method further includes setting (605) a differentiated services code point, DSCP, value of the dedicated IPsec SA according to the SLA.

In some embodiments, the SLA is configured in the first network node in the first network and in a second network node in the second network.

In some embodiments, the SLA includes a mapping between the DSCP value of the dedicated IPsec SA and a set of QoS parameters for the service of the first network.

Referring now to FIG. 7, in some embodiments, the method further includes instructing (705) the communication device to set the DSCP value of the dedicated IPsec SA for the service of the first network based on the mapping in the SLA between the DSCP value of the dedicated IPsec SA and a set of QoS parameters for the service of the first network.

In some embodiments, the method further includes signalling (701) a message to the communication device including a set of QoS parameters describing the QoS flow. The method further includes, responsive to the request, signalling (703) a response to the communication device that includes the instruction to set the DSCP value.

In some embodiments, the setting a DSCP value includes marking on a plurality of DSCP bits in an internet protocol, IP, header of the dedicated IPsec SA.

In some embodiments, the first network is an overlay network and the second network is an underlay network.

Various operations from the flow chart of FIG. 7 may be optional with respect to some embodiments of a method performed by a first network node, and related methods. For example, operations of blocks 701, 703, 705 of FIG. 7 may be optional.

Operations specific to a second network node (e.g., SMF node 109 or PCF node 121 implemented using the structure of the block diagram of FIG. 5) will now be discussed with reference to the flow charts of FIGS. 8-9 according to some embodiments of inventive concepts. For example, modules may be stored in memory 505 of FIG. 5, and these modules may provide instructions so that when the instructions of a module are executed by respective first network node processing circuitry 503, processing circuitry 503 performs respective operations of the flow charts of FIGS. 8-9.

Figure 8:
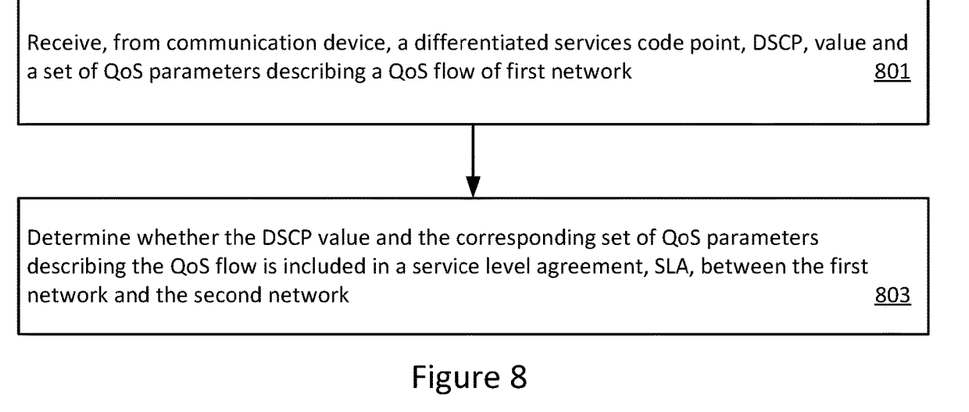
FIGS. 8-9 are flow charts illustrating operations of a second network node in accordance with some embodiments of the present disclosure.
Figure 9:
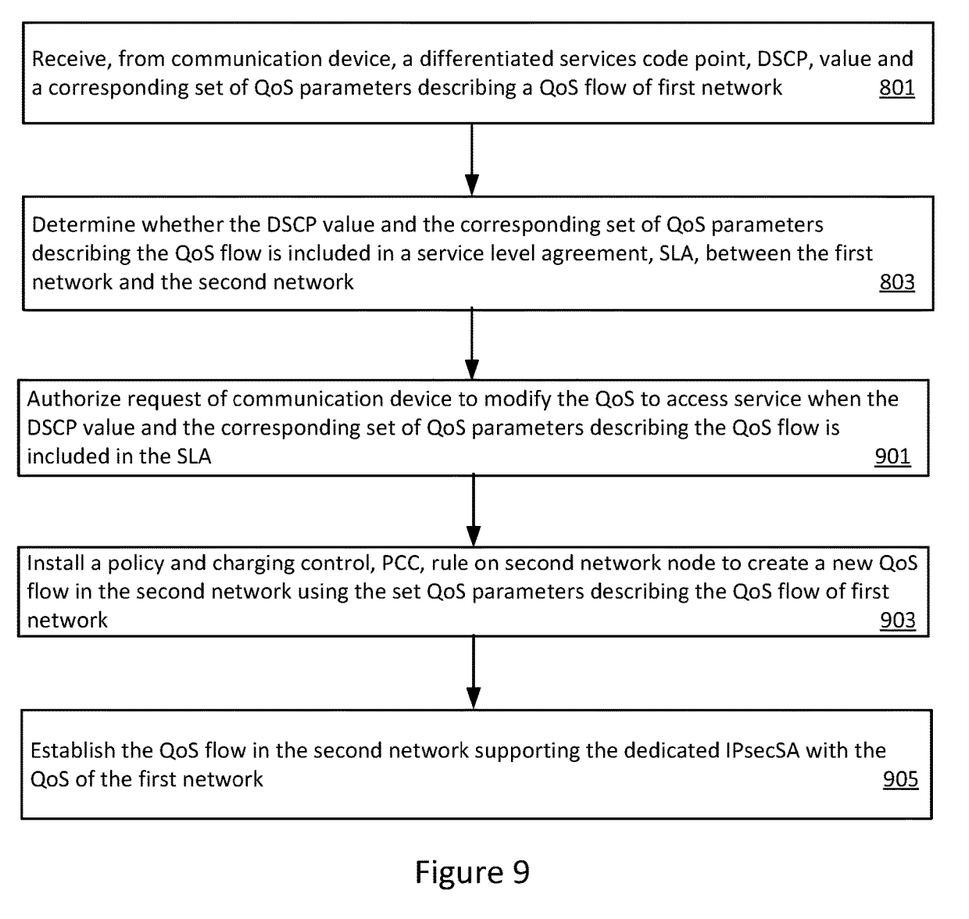

Each of the operations described in FIGS. 8-9 can be combined and/or omitted in any combination with each other, and it is contemplated that all such combinations fall within the spirit and scope of this disclosure.

Referring first to FIG. 8, a method is provided that is performed by a second network node (e.g., 109, 121, 500) in a second network (e.g., 103, 101) for support in the second network of a quality of service, QoS, of a first network (e.g., 101, 103) for a communication device (e.g., 107) initiated QoS modification when the communication device is accessing a service of the first network via the second network. The method includes receiving (801), from the communication device, a differentiated services code point, DSCP, value and a corresponding set of QoS parameters describing a QoS flow of the first network. The method further includes, responsive to the receiving, determining (803) whether the DSCP value and the corresponding set of QoS parameters describing the QoS flow is included in a service level agreement, SLA, between the first network and the second network.

Referring now to FIG. 9, in some embodiments, the method further includes authorizing (901) the request of the communication device to modify the QoS to access the service when the DSCP value and the corresponding set of QoS parameters describing the QoS flow is included in the SLA.

In some embodiments, the SLA is configured in the second network node in the second network and in a first network node in the first network.

In some embodiments, the SLA includes a mapping between the DSCP value of a dedicated internet security, IPsec, security association, SA, and a set of QoS parameters for the service of the first network.

In some embodiments, the determining (803) is based on an internet protocol, IP, address for the first network node and the mapping in the SLA.

In some embodiments, the method further includes installing (903) a policy and charging control, PCC, rule on the second network node to create a new QoS flow in the second network using the set QoS parameters describing the QoS flow of the first network.

In some embodiments, the method further includes establishing (905) the QoS flow in the second network supporting the dedicated IPsecSA with the QoS of the first network.

In some embodiments, the first network is an overlay network and the second network is an underlay network.

Various operations from the flow chart of FIG. 9 may be optional with respect to some embodiments of a method performed by a second network node, and related methods. For example, operations of blocks 901, 903, 905 FIG. 9 may be optional.

Operations of a communication device (e.g., communication device 107 implemented using the structure of the block diagram of FIG. 3) will now be discussed with reference to the flow charts of FIGS. 10-11 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow charts.

Each of the operations described in FIGS. 10-11 can be combined and/or omitted in any combination with each other, and it is contemplated that all such combinations fall within the spirit and scope of this disclosure.

Referring first to FIG. 10, a method is provided that is performed by a communication device (e.g., 107, 300) for support in a second network (e.g., 103, 101) of a quality of service, QoS, of a first network (e.g., 101, 103) for a QoS modification initiated by the communication device when the communication device is accessing a service of the first network via the second network. The method includes receiving (1001), from a first network node in the first network, an instruction to set a differentiated services code point, DSCP, value of a dedicated IPsec SA for the service of the first network. The instruction is based on a mapping in a service level agreement, SLA, between the DSCP value of the dedicated IPsec SA and a set of QoS parameters for the service of the first network. The method further includes adding (1003) the DSCP value to a packet filter when the communication device initiates the QoS modification in the second network.

In some embodiments, the SLA is configured in the first network node in the first network and in a second network node in the second network.

In some embodiments, the method further includes receiving (1101) a message from the first network node including a set of QoS parameters describing a QoS flow.

In some embodiments, the set a DSCP value comprises marking on a plurality of DSCP bits in an internet protocol, IP, header of the dedicated IPsec SA.

In some embodiments, the method further includes signalling (1103) to the second network node a request for a QoS flow based on the set of QoS parameters describing the QoS flow. The QoS rule of the requested QoS flow includes the packet filter having an internet protocol, IP, address for the first network node, a security parameter index, SPI, and the DSCP value associated with the dedicated IPSec SA flow.

In some embodiments, the method further includes establishing (1105) the QoS flow in the second network supporting the dedicated IPsecSA with the QoS of the first network.

In some embodiments, the first network is an overlay network and the second network is an underlay network.

Various operations from the flow chart of FIG. 11 may be optional with respect to some embodiments of a method performed by a communication device, and related methods. For example, operations of blocks 1101, 1103, 1105 of FIG. 11 may be optional.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNodeBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a network node having cloud-based functions (e.g., a virtual network node deployed in a cloud environment or a network node having functions (e.g., a management system) deployed in a cloud environment as described herein. More generally, however, network nodes may represent any suitable device (or group of devices) capable, configured, arranged, and/or operable to enable and/or provide a wireless device with access to the wireless network or to provide some service to a wireless device that has accessed the wireless network.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method performed by a first network node in a first network for support in a second network of a quality of service, QoS, of the first network when a communication device is accessing a service of the first network via the second network, the method comprising:
   checking a QoS profile for a QoS flow of the first network based on a service level agreement, SLA, between the first network and the second network to determine whether a communication device initiated QoS flow is supported by the second network;
   when the QoS flow is supported by the second network, creating a dedicated internet protocol security, IPsec, security association, SA, between the first network node and the communication device for handling the QoS flow in the second network;
   setting a differentiated services code point, DSCP, value that is used for the dedicated IPsec SA, comprising marking on a plurality of DSCP bits in an internet protocol, IP, header of the dedicated IPsec SA, the DSCP value set according to the SLA; and
   signaling to the communication device a message comprising the DSCP value of the dedicated IPSec SA according to the SLA based on a mapping in the SLA between the DSCP value of the dedicated IPsec SA and a set of QOS parameters for the service of the first network,
   wherein the communication device, in a request for a QoS rule, passes the DSCP value to a second network node in the second network to determine QoS in the second network according to the DSCP value set according to the SLA.

2. The method of claim 1, wherein the SLA is configured in the first network node in the first network and in a second network node in the second network.

3. The method of claim 2, further comprising:
   signalling a message to the communication device including a set of QOS parameters describing the QoS flow;
   responsive to the request, signalling a response to the communication device that includes the instruction to set the DSCP value.

4. The method of claim 1, further comprising:
   signalling a message to the communication device including a set of QOS parameters describing the QoS flow;
   responsive to the request, signalling a response to the communication device that includes the instruction to set the DSCP value.

5. The method of claim 1, wherein the first network is an overlay network and the second network is an underlay network.

6. The method of claim 2, wherein the first network is an overlay network and the second network is an underlay network.

7. A first network node in a first network, the first network node comprising:
   processing circuitry; and
   memory coupled with the processing circuitry, wherein the memory includes instructions that when executed by the processing circuitry causes the first network node to perform operations for support in a second network of a quality of service, QOS, of the first network when a communication device is accessing a service of the first network via the second network, the operations comprising:
   check a QoS profile for a QoS flow of the first network based on a service level agreement, SLA, between the first network and the second network to determine whether a communication device initiated QoS flow is supported by the second network;
   when the QoS flow is supported by the second network, create a dedicated internet protocol security, IPsec, security association, SA, between the first network node and the communication device for handling the QoS flow in the second network;
   set a differentiated services code point, DSCP, value that is used for the dedicated IPsec SA, comprising marking on a plurality of DSCP bits in an internet protocol, IP, header of the dedicated IPsec SA, the DSCP value set according to the SLA; and
   signalling to the communication device a message comprising the DSCP value of the dedicated IPSec SA according to the SLA based on a mapping in the SLA between the DSCP value of the dedicated IPsec SA and a set of QOS parameters for the service of the first network, wherein the communication device, in a request for a QOS rule, passes the DSCP value to a second network node in the second network to determine the QoS in the second network according to the DSCP value set according to the SLA.

8. The first network node of claim 7, wherein the SLA is configured in the first network node in the first network and in a second network node in the second network.

9. A non-transitory computer readable medium comprising program code to be executed by processing circuitry of a first network node in a first network, whereby execution of the program code causes the first network node to perform operations for support in a second network of a quality of service, QoS, of the first network when a communication device is accessing a service of the first network via the second network, the operations comprising:

check a QoS profile for a QoS flow of the first network based on a service level agreement, SLA, between the first network and the second network to determine whether a communication device initiated QoS flow is supported by the second network;

when the QoS is supported by the second network, create a dedicated internet protocol security, IPsec, security association, SA, between the first network node and the communication device for handling the QoS flow in the second network;

set a differentiated services code point, DSCP, value that is used for the dedicated IPsec SA, comprising marking on a plurality of DSCP bits in an internet protocol, IP, header of the dedicated IPsec SA, the DSCP value set according to the SLA; and signaling to the communication device a message comprising the DSCP value of the dedicated IPSec SA according to the SLA based on a mapping in the SLA between the DSCP value for the dedicated IPsec SA and a set of QoS parameters for the service of the first network, wherein the communication device, in a request for a QoS rule, passes the DSCP value to a second network node in the second network to determine the QoS in the second network according to the DSCP value set according to the SLA.

10. The non-transitory computer readable medium of claim 9, wherein the SLA is configured in the first network node in the first network and in a second network node in the second network.

* * * * *